United States Patent
Park et al.

(10) Patent No.: US 10,503,011 B2
(45) Date of Patent: Dec. 10, 2019

(54) DIFFUSER PLATE SUPPORTER, BACKLIGHT UNIT, AND ELECTRONIC DEVICE

(71) Applicant: LG Display Co., Ltd., Seoul (KR)

(72) Inventors: KiDuck Park, Paju-si (KR); JongWan Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/040,759

(22) Filed: Jul. 20, 2018

(65) Prior Publication Data

US 2019/0025653 A1  Jan. 24, 2019

(30) Foreign Application Priority Data

Jul. 21, 2017  (KR) .......................... 10-2017-0093026

(51) Int. Cl.
   *G02F 1/1335*  (2006.01)
(52) U.S. Cl.
   CPC .. *G02F 1/133608* (2013.01); *G02F 1/133606* (2013.01); *G02F 2203/01* (2013.01)
(58) Field of Classification Search
   CPC ................... G02F 1/133608; G02F 1/133606
   USPC ........................................................ 362/97.1
   See application file for complete search history.

(56) References Cited

U.S. PATENT DOCUMENTS

| 7,407,318 | B2 * | 8/2008 | Chang | G02F 1/133604 362/225 |
| 7,510,318 | B2 * | 3/2009 | Chen | G02F 1/133608 362/632 |
| 7,549,761 | B2 * | 6/2009 | Chen | G02F 1/133604 362/221 |
| 7,604,365 | B2 * | 10/2009 | Chang | G02F 1/133608 362/241 |

(Continued)

FOREIGN PATENT DOCUMENTS

| EP | 2762963 A1 | 8/2014 |
| JP | 2006-210337 A | 8/2006 |

(Continued)

OTHER PUBLICATIONS

European Search Report dated Dec. 17, 2018 issued in the corresponding European Patent Application No. 18183634.7, pp. 1-7.

(Continued)

*Primary Examiner* — Bryon T Gyllstrom
(74) *Attorney, Agent, or Firm* — Polsinelli PC

(57) ABSTRACT

Aspects disclosed herein relate to a diffuser plate supporter, a backlight unit, and an electronic device, in which a portion configured to support a diffuser plate in a diffuser plate supporter is made of a transparent material and a portion to be fastened to the cover bottom is made of an opaque material, so that the diffuser plate supporter can prevent light leakage from occurring on the back side of the cover bottom without interfering with light reaching the diffuser plate. In addition, through a reinforcement design for the boundary portion between the portion made of the transparent material (Continued)

and the portion made of the opaque material, it is possible to prevent the portions made of different materials from being separated from each other during rotational fastening of the diffusion plate supporter.

14 Claims, 10 Drawing Sheets

(56) References Cited

U.S. PATENT DOCUMENTS

| | | | | |
|---|---|---|---|---|
| 2005/0073858 | A1* | 4/2005 | Kim | F21V 19/009 362/561 |
| 2006/0072299 | A1* | 4/2006 | Lai | G02F 1/133608 362/97.1 |
| 2007/0091589 | A1* | 4/2007 | Choi | G02F 1/133608 362/97.2 |
| 2007/0103908 | A1* | 5/2007 | Tabito | G02F 1/133608 362/294 |
| 2009/0046445 | A1* | 2/2009 | Namiki | G02F 1/133608 362/97.2 |
| 2010/0085734 | A1* | 4/2010 | Kim | G02F 1/133604 362/97.1 |
| 2010/0123852 | A1* | 5/2010 | Lee | G02F 1/133604 349/61 |
| 2011/0103040 | A1* | 5/2011 | Teragawa | G02F 1/133608 362/97.1 |
| 2014/0211123 | A1* | 7/2014 | Lee | G02F 1/133606 349/64 |

FOREIGN PATENT DOCUMENTS

| | | |
|---|---|---|
| JP | 2007-157450 A | 6/2007 |
| JP | 2010-192301 A | 9/2010 |
| JP | 2014-149529 A1 | 8/2014 |
| KR | 2007-0120856 A | 12/2007 |

OTHER PUBLICATIONS

Office Action issued in Japanese Patent Application No. 2018-137562 dated May 14, 2019. (6 pages).

* cited by examiner

| Person | Sample | [New] Hybrid DPS | |
|---|---|---|---|
| | | Before Improvement  | After Improvement  |
| A | #01 | O.K | O.K |
| | #02 | O.K | O.K |
| | #03 | N.G (Crack) | O.K |
| | #04 | N.G (Crack) | O.K |
| | #05 | O.K | O.K |
| B | #06 | O.K | O.K |
| | #07 | O.K | O.K |
| | #08 | O.K | O.K |
| | #09 | O.K | O.K |
| | #10 | N.G (Crack) | O.K |
| Yield | Total Number | 10ea | 10ea |
| | Defective Number | 3ea | - |
| | O.K(Ratio) | 70.0% | 100% |

DIFFUSER PLATE SUPPORTER, BACKLIGHT UNIT, AND ELECTRONIC DEVICE

CROSS REFERENCE TO RELATED APPLICATION

This application claims priority from Korean Patent Application No. 10-2017-0093026, filed on Jul. 21, 2017, which is hereby incorporated by reference for all purposes as if fully set forth herein in its entirety.

BACKGROUND

Field of the Disclosure

The present disclosure relates to a diffuser plate supporter, a backlight unit, and an electronic device.

Description of the Background

As the current society has developed into an information-based society, various demand of users for a display device for displaying images is increasing, and various types of display devices such as a liquid crystal display device, a plasma display device, and an organic light-emitting display device are being utilized.

Among such display devices, a liquid crystal display device expresses colors and gray levels by arranging liquid crystals in a display panel and changing the arrangement of the liquid crystals according to a voltage applied to the liquid crystals. Here, the liquid crystal display device includes a structure such as a backlight unit emitting light to the liquid crystals arranged in the display panel.

The backlight unit includes a light source device that emits light, and the light source device may be disposed on a side of the display panel (i.e., edge type) or on the lower side of the display panel (i.e., direct type) depending on the type of backlight unit.

Here, in the case where the backlight unit is of a directly-under type, the light source device is disposed on the top surface of a cover bottom that accommodates the components of the backlight unit, and a diffuser plate, which diffuses the light emitted from the light source device, may be disposed apart from the light source device. Further, in order to prevent the diffuser plate from sagging, a diffuser plate supporter for supporting the diffuser plate may be disposed between the top surface of the cover bottom and the bottom surface of the diffuser plate.

The diffuser plate supporter is fastened and fixed to the cover bottom and has a protruding shape. The diffuser plate supporter can support the bottom surface of the diffuser plate.

In addition, since the diffuser plate supporter is disposed to prevent the diffuser plate from sagging, the diffuser plate may be disposed in a central region (or a region excluding an edge) of the cover bottom that is not supported by the cover bottom.

Therefore, the diffuser plate supporter may be located at a position where the light source device is not disposed in the central region of the cover bottom, and the diffuser plate supporter is disposed in the form of supporting the diffuser plate between the cover bottom and the diffuser plate. Thus, the diffuser plate supporter may hinder the light emitted from the light source device from reaching the diffuser plate.

In order to solve this problem, a transparent diffuser plate supporter may be used.

However, when the transparent diffuser plate supporter is used, light leakage can occur through a hole in the cover bottom to which the diffuser plate supporter is fastened.

Thus, there is a problem in that the efficiency of light emitted from the light source device is reduced.

SUMMARY

In this background, an aspect of the disclosure disclosed herein is to provide an organic light emitting display and a method of fabricating the same, which can minimize an upper encapsulation layer of a display device to reduce crack at the time of banding, thereby reducing damage to a substrate. An aspect of the disclosure disclosed herein is to provide a diffuser plate supporter capable of preventing back side light leakage of a backlight unit without interfering with the moving path of light emitted from the light source device of the backlight unit, and to provide a backlight unit including the diffuser plate supporter and an electronic apparatus including the diffuser plate supporter.

Another aspect of the present disclosure is to provide a rigid diffuser plate supporter which is capable of preventing damage of a diffuser plate supporter supporting the diffuser plate when the diffuser plate supporter is fastened to the cover bottom.

In one aspect, the present disclosure herein provides a backlight unit including a cover bottom, a light source disposed on the cover bottom, a diffuser plate disposed to be spaced apart from the light source, a diffuser plate supporter fastened to the cover bottom and configured to support the diffuser plate. The diffuser plate supporter includes a transparent support portion configured to support the bottom surface of the diffuser plate, an opaque base connected to the lower end of the support portion, and a fastening portion connected to the bottom surface of the base and passing through the cover bottom such that a portion of the fastening portion is located below the cover bottom below.

In another aspect, the present disclosure provides a diffuser plate supporter including a transparent support portion having a protruding shape, a transparent connection portion extending in a horizontal direction from the lower end of the support portion and bent in a vertical direction, an opaque base having a side surface, at least a part of which is connected to an end of the connection portion, and an opaque fastening portion protruding from the bottom surface of the base.

In yet another aspect, the present disclosure provides a diffuser plate supporter including a transparent support portion having a protruding shape, an opaque base connected to the lower end of the support portion and having an area wider than the area of the lower end of the support portion, and an opaque fastening portion protruding from the bottom surface of the base.

In a further aspect, the present disclosure provides an electronic device including a display panel, and a backlight unit configured to supply light to the lower portion of the display panel. The backlight unit includes a light source, a diffuser plate disposed to be spaced apart from the light source, a cover bottom configured to accommodate the light source and the diffuser plate therein, and a diffuser plate supporter fastened to the cover bottom and configured to support the diffuser plate. The diffuser plate supporter includes a transparent support portion configured to support the bottom surface of the diffuser plate, a transparent connection portion extending in a horizontal direction from the lower end of the support portion and bent in a vertical direction, an opaque base having a side surface, at least a part of which is connected to an end of the connection portion, and a fastening portion connected to the bottom surface of the base and passing through the cover bottom such that a portion of the fastening portion is located below the cover bottom.

According to aspects disclosed herein, by the portion supporting the diffuser plate in the diffuser plate supporter transparent, it is possible to prevent the diffuser plate supporter from interfering with the moving path of light emitted from the light source device.

In addition, by making the portion of the diffuser plate supporter, which is fastened to the cover bottom, opaque, it is possible to prevent light leakage from occurring through the hole of the cover bottom to which the diffuser plate supporter is fastened.

Further, by increasing the contact area at the portion where the transparent support portion and the opaque fastening portion are connected in the diffuser plate supporter, it is possible to prevent the support portion and the fastening portion of the diffuser plate supporter from peeling off during of fastening of the diffuser plate supporter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
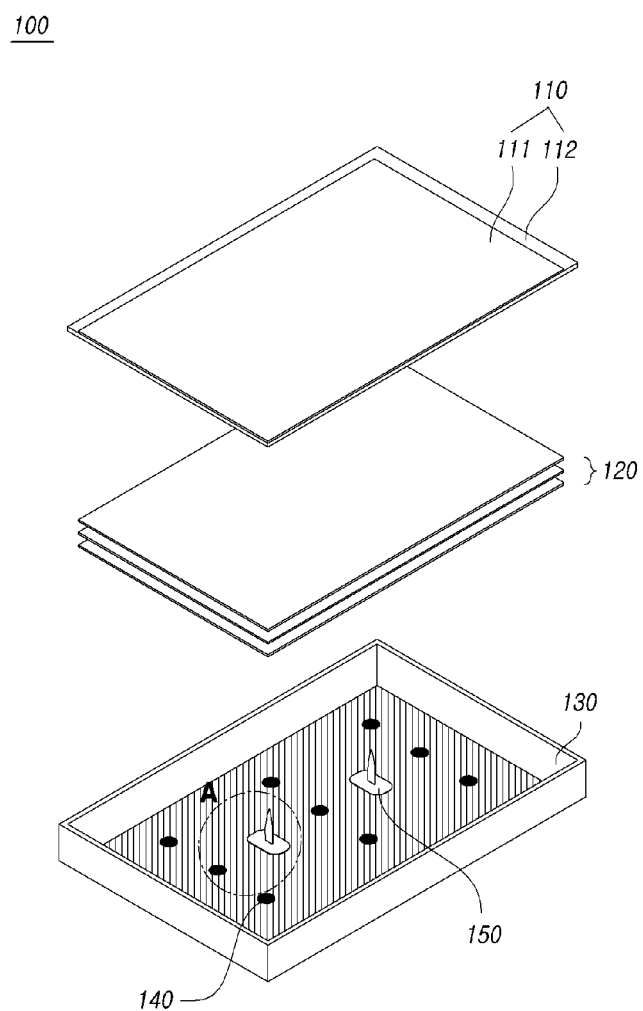
FIG. 1 is a view illustrating a schematic configuration of a display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view illustrating a schematic configuration of a display device 100 according to aspects of the present disclosure.

Referring to FIG. 1, a display device 100 according to an aspect of the present disclosure may include a display panel 110 displaying an image, a backlight unit emitting light to the display panel 110, a chassis unit fastening each component of the display device 100, and the like.

The display panel 110 may include a first substrate 111 on which a thin film transistor (TFT), various signal lines, and the like are disposed, a second substrate 112 on which a color filter is disposed, etc.

The backlight unit may include a light source device 140 disposed under the display panel 110 and configured to emit light to the display panel 110.

The backlight unit may be of a direct type in which the light source unit 140 is positioned under the display panel 110, or of an edge type in which the light source unit 140 is disposed on a side of the display panel 110.

FIG. 1 illustrates a case where the backlight unit is of a direct type, in which a light source unit 140 including a light source and a lens may be disposed under the display panel 110.

When the backlight unit is of the edge type, the light source device 140 is disposed on a side of the display panel 110 and may include a light guide plate (not illustrated) guiding the light emitted from the light source device 140 to the display panel 110.

The backlight unit may include at least one sheet (or a diffuser plate 120) such as a lens of the light source device 140 or a diffusion sheet for diffusing light to the upper portion of the light guide plate, and may include a reflector (not illustrated) or the like the light source for increasing light efficiency under the light source device 140 or the light guide plate.

Here, in order to prevent the diffuser plate 120 from sagging downwards, a diffuser plate supporter 150 that supports the diffuser plate 120 may be disposed under the diffuser plate 120.

Such a diffuser plate supporter 150 may be disposed between the light source devices 140 and may have a structure for supporting the lower portion of the diffuser plate 120.

A chassis unit may serve to fasten or protect components of the display panel 110, the backlight unit, and the like, and may include a guide panel (not illustrated), a cover bottom 130, and the like.

Figure 2:
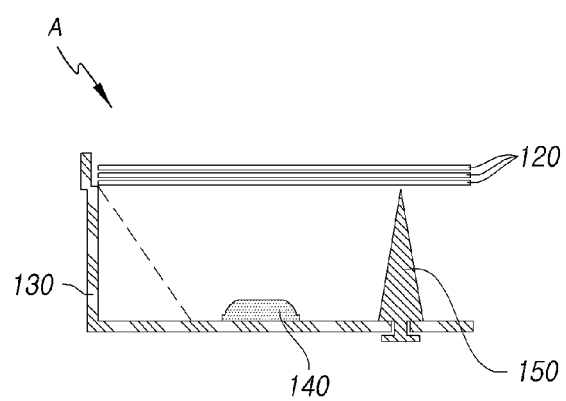
FIG. 2 is a view illustrating an example of a cross-section of a backlight unit according to aspects of the present disclosure.

FIG. 2 illustrates an example of the structure of the backlight unit when the backlight unit is of a direct type in the display device 100 according to the present aspects.

Referring to FIG. 2, the backlight unit according to the present aspects may include a light source device 140, a diffuser plate 120 disposed apart from the light source device 140, and a cover bottom 130 accommodating the light source device 140, the diffuser plate 120, and the like therein.

In addition, a diffuser plate supporter 150, which is a structure for supporting the diffuser plate 120, may be disposed between the diffuser plate 120 and the cover bottom 130.

The diffuser plate supporter 150 may be fastened and fixed to a hole in the cover bottom 130 and may have a protruding shape to support the bottom surface of the diffuser plate 120.

Since the diffuser plate supporter 150 is disposed in order to prevent the diffuser plate 120 from sagging, the diffuser plate supporter may be disposed in the central region of the cover bottom 130 where the diffuser plate 120 is not supported by the cover bottom 130.

That is, as illustrated in FIG. 2, the diffuser plate supporter 150 may be disposed at a position where the light source device 140 is not disposed on the top surface of the cover bottom 130.

Therefore, the diffuser plate supporter 150 may hinder the light emitted from the light source device 140 from reaching the diffuser plate 120. In order to prevent this, a transparent diffuser plate supporter 150 may be used. However, when the transparent diffuser plate supporter 150 is used, there is a problem in that light leakage may occur through a hole in the cover bottom 130 to which the diffuser plate supporters 150 is fastened.

An aspect of the present disclosure provides a diffuser plate supporter 150 that prevents light leakage from occurring on the back side of the cover bottom 130 without interfering with the diffusion of the light emitted from the light source device 140.

Figure 3:
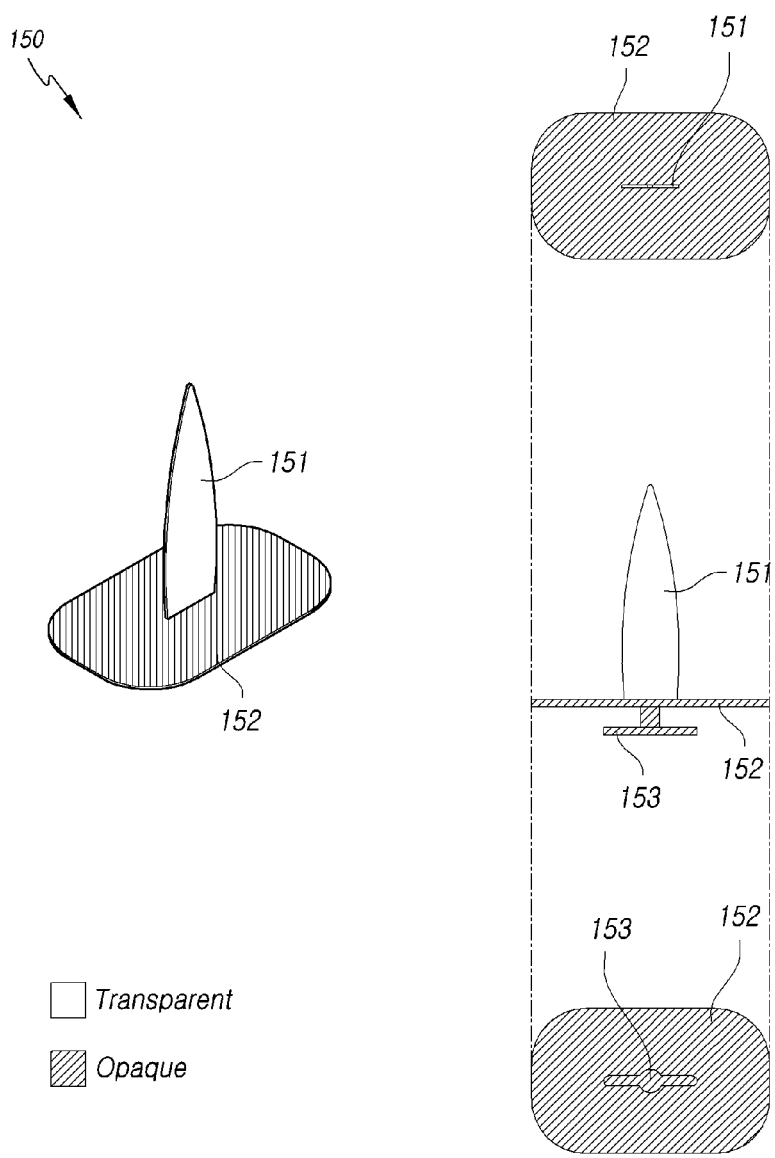
FIG. 3 is view illustrating a first aspect of the diffuser plate supporter according to the aspects of the present disclosure.

FIG. 3 illustrates a first aspect of the diffuser plate supporter 150 according to the present disclosure.

Referring to FIG. 3, the diffuser plate supporter 150 according to the present aspects may include a support portion 151 having a protruding shape and configured to support the diffuser plate 120, a base 152 connected to the lower end of the support portion 151, and a fastening portion 153 protruding from the bottom surface of the base 152.

The support portion 151 of the diffuser plate supporter 150 supports the bottom surface of the diffuser plate 120 so as to prevent the diffuser plate 120 from sagging, and may be formed of a transparent material.

As supporting the bottom surface of the diffuser plate 120, the support portion 151 of the diffuser plate supporter 150, which is positioned between the cover bottom 130 and the diffuser plate 120, is made of a transparent material, so that the support portion 151 does not interfere with the diffusion of the light emitted from the light source device 140.

The base 152 connected to the lower end of the support portion 151 may have a larger area than that of the lower end of the support portion 151.

In addition, the base 152 may be made of an opaque material unlike the support portion 151. For example, the base 152 may have a white color having high reflectance.

The fastening portion 153 protruding from the bottom surface of the base 152 may have a structure that protrudes from the bottom surface of the base 152 and extends in the horizontal direction. The fastening portion 153 may be made of an opaque material and may be made of the same material as the base 152. That is, the base 152 and the fastening portion 153 may be formed of the same material and may be integrally formed.

The diffuser plate supporter 150 may be fastened to the hole formed in the cover bottom 130 by the structure of the fastening portion 153.

For example, the diffuser plate supporter 150 can be fastened and fixed to the cover bottom 130 by rotating the fastening portion 153 after the fastening portion 153 passes through the hole formed in the cover bottom 130.

When the diffuser plate supporter 150 is fastened to the cover bottom 130, the fastening portion 153 is positioned in and under the hole in the cover bottom 130. In addition, the base 152 connected to the fastening portion 153 is positioned on the top surface of the cover bottom 130.

Accordingly, when the diffuser plate supporter 150 is fastened to the cover bottom 130, the base 152 of the diffuser plate supporter 150 covers the hole in the cover bottom 130, and since the base 152 is made of an opaque material, it is possible to prevent light leakage from occurring through the hole in the cover bottom 130.

That is, the diffuser plate supporter 150 according to the first aspect may have the support portion 151, which supports the diffuser plate 120 and may be positioned between the cover bottom 130 and the diffuser plate 120, is made of a transparent material and when the diffuser plate supporter 150 is fastened to the cover bottom 130, the opaque base 152 is disposed to cover the hole in the cover bottom 130.

Accordingly, the diffuser plate supporter 150 can prevent light leakage from occurring through the hole in the cover bottom 130 without interfering with the diffusion of the light emitted from the light source device 140.

The diffuser plate supporter 150 may further include a structure for connecting the support portion 151 and the base 152 so as to facilitate fastening to the cover bottom 130.

Figure 4:
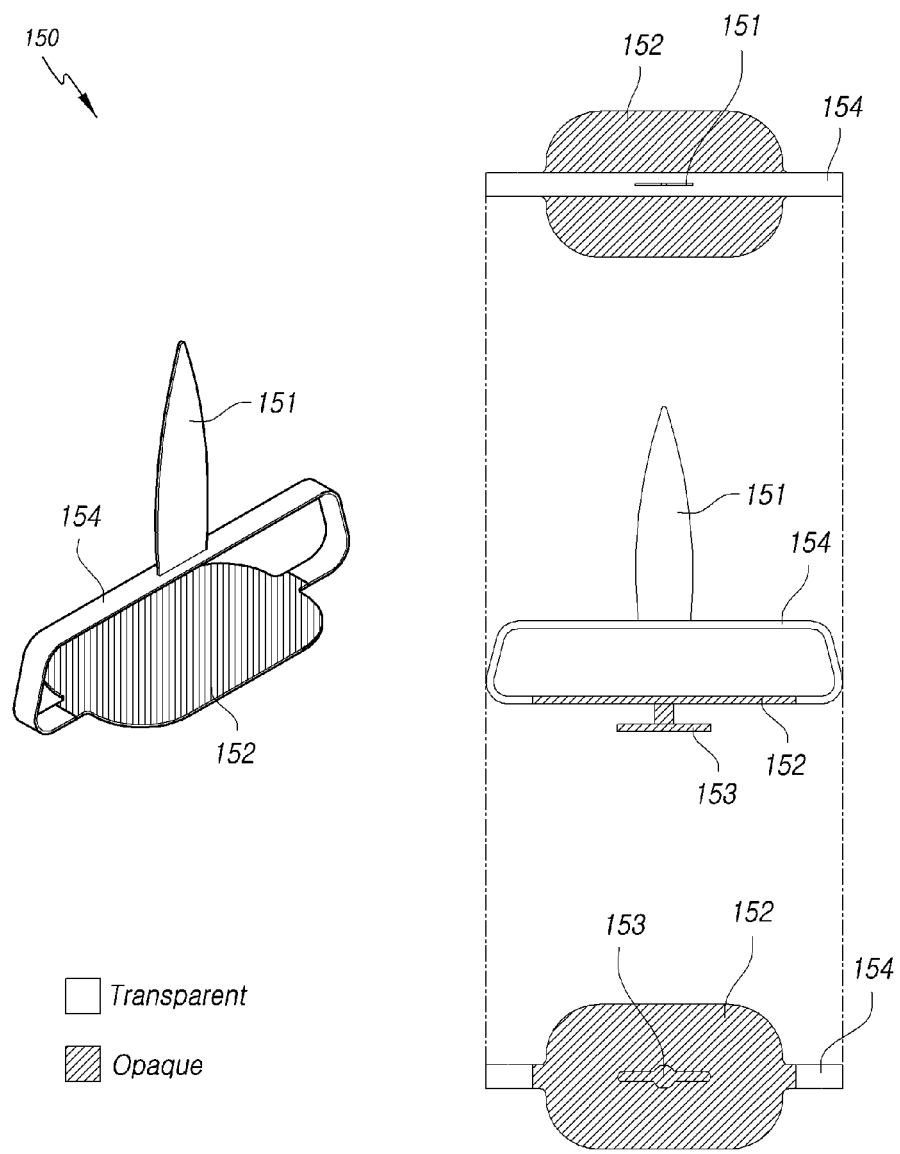
FIG. 4 is view illustrating a second aspect of the diffuser plate supporter according to the aspects of the present disclosure.

FIG. 4 illustrates a second aspect of the diffuser plate supporter 150 according to the present disclosure, in which a structure including a connection portion 154 between the support portion 151 and the base 152 of the diffuser plate supporter 150.

Referring to FIG. 4, the diffuser plate supporter 150 according to the second aspect of the present disclosure may include a support portion 151 having a protruding shape and supporting the diffuser plate 120, a curved connection portion 154 extending in the horizontal direction at the lower end of the support portion 151, a base 152 having side surfaces which are at least partially connected to the connection portion 154, and a fastening portion 153 protruding from the bottom surface of the base 152.

The support portion 151 is made of a transparent material, so that the support portion 151 can support the bottom surface of the diffuser plate 120 without interfering with the diffusion of the light emitted from the light source device 140.

The connection portion 154 may extend in the horizontal direction at the lower end of the support portion 151 and may be bent in the vertical direction to be connected to the side surfaces of the base 152.

For example, as illustrated in FIG. 4, the connection portion 154 may extend in opposite directions at the lower end of the support portion 151 and may be bent downward to be connected to the opposite side surfaces of the base 152.

The support portion 151 and the base 152 may be spaced apart from each other by the connection portion 154, and the connection portion may serve as a handle, thereby facilitating the rotation of the diffuser plate supporter 150 when fastening the diffuser plate supporter 150.

In addition, since the connection portion 154 is made of a transparent material, the connection portion 154 may not interfere with the diffusion of the light emitted from the light source device 140.

At this time, the connection portion 154 may be made of the same material as the support portion 151, and may be formed integrally with the support portion 151. That is, the support portion 151 and the connection portion 154, which are made of a transparent material, may be integrally formed of the same material. Alternatively, the support portion 151 and the connection portion 154 may be made of the same material and may form a structure in which the support portion 151 and the connection portion 154 are continuously connected to each other.

The base 152 is connected to the connection portion 154 on opposite side surfaces to support the support portion 151 and the connection portion 154 and may be made of an opaque material. When the diffuser plate supporter 150 is fastened to the cover bottom 130, the base 152 is disposed to cover the hole in the cover bottom 130 so as to prevent light leakage from occurring through the hole in the cover bottom 130.

That is, the diffuser plate supporter 150 according to the second aspect prevents the light diffusion from being interfered with by the support portion 151 and the connection portion 154, which are made of a transparent material, and back side light leakage of the cover bottom 130 can be prevented by the base 152, which is made of an opaque material.

In addition, the fastening of the diffuser plate supporter 150 to the cover bottom 130 can be facilitated through the structure of the connection portion 154.

Figure 5:
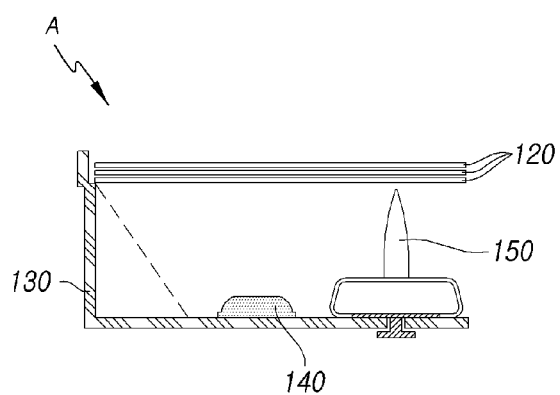
FIG. 5 is a view illustrating an example of a structure in which the diffuser plate supporter according to the second aspect is disposed in a backlight unit according to aspects of the present disclosure.

FIG. 5 illustrates an example of a backlight unit in which the diffuser plate supporter 150 according to the second aspect of the present disclosure is disposed.

Referring to FIG. 5, when the diffuser plate supporter 150 is fastened to the cover bottom 130, the protruding support portion 151 supports the diffuser plate 120 so as to prevent the diffuser plate 120 from sagging.

In addition, since the support portion 151 and the connection portion 154 of the diffuser plate supporter 150 are made of a transparent material, the support portion 151 and the connection portion 154 does not interfere with the diffusion of the light emitted from the light source device 140.

When the diffuser plate supporter 150 is fastened to the cover bottom 130, the base 152 of the diffuser plate supporter 150 is disposed to cover the hole in the cover bottom 130, and the fastening portion 153 is located in and under the hole in the cover bottom 130.

Here, since the base 152 and the fastening portion 153 are made of an opaque material, light leakage can be prevented from occurring through the hole in the cover bottom 130 to which the diffuser plate supporter 150 is fastened.

Such a diffuser plate supporter 150 may be manufactured through a double injection method since the diffuser supporter 150 is made of a transparent material and an opaque material.

For example, after forming the support portion 151 and the connection portion 154 using a transparent material, the base 152 and the fastening portion 153 may be formed using an opaque material. That is, it is possible to form a diffuser plate supporter 150 including a portion formed of a transparent material and a portion formed of an opaque material by forming the support portion 151 and the connection portion 154, which are made of a transparent material, through primary injection molding, and the base 152 and the fastening portion 153, which are made of an opaque material, through secondary injection molding.

Therefore, by using a transparent material and an opaque material together to constitute the diffuser plate supporter 150, it is possible to prevent the interference of light diffusion by the diffuser plate supporter 150, back side light leakage, etc. However, a boundary portion between a portion made of a transparent material and a portion made of an opaque material may not be strong.

Accordingly, when the diffuser plate supporter 150 is fastened to the cover bottom 130, damage may occur at the boundary between the transparent material portion and the opaque material portion.

Figure 6:
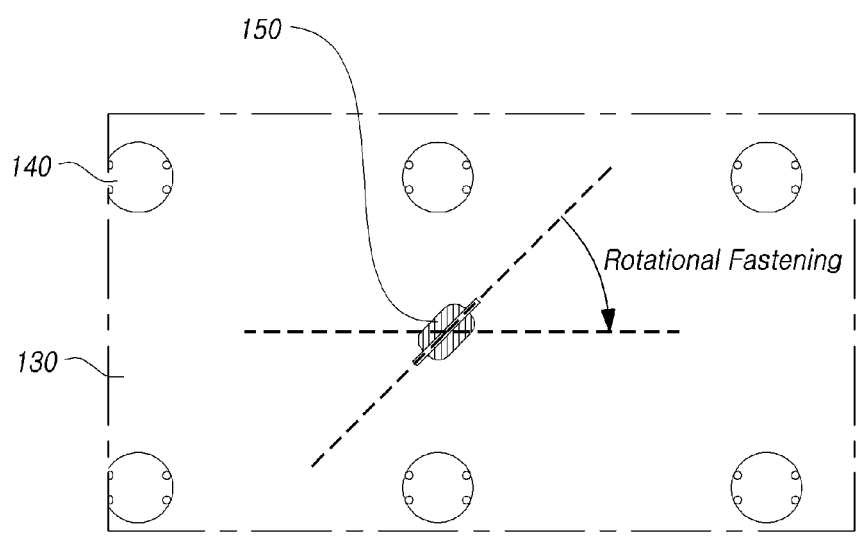
FIG. 6 is view illustrating a method of fastening a diffuser plate supporter according to the aspects of the present disclosure to a cover bottom.

FIG. 6 illustrates an example of a method of fastening the diffuser plate supporter 150 according to the present aspects to the cover bottom 130, in which a case where the diffuser plate supporter 150 according to the second aspect is fastened is illustrated.

Referring to FIG. 6, in order to fasten the diffuser plate supporter 150 to the cover bottom 130, the fastening portion 153 of the diffuser plate supporter 150 is inserted into the hole in the cover bottom 130, and the connection portion 154 is held and rotatable by hand, so that the diffuser plate supporter 150 can be fixed to the cover bottom 130.

Thus, damage may occur at the boundary portion between an end of the connection portion 154, which is made of a transparent material, and the base 152, which is made of an opaque material, and thus the transparent material portion and the opaque material portion may be separated from each other.

The present aspects provide a diffuser plate supporter 150 capable of preventing interference of light diffusion and backside light leakage, and further provide a structure of a diffuser plate supporter 150 capable of preventing the diffuser plate supporter from being damaged during the fastening of the diffusing plate supporter 150.

Figure 7:
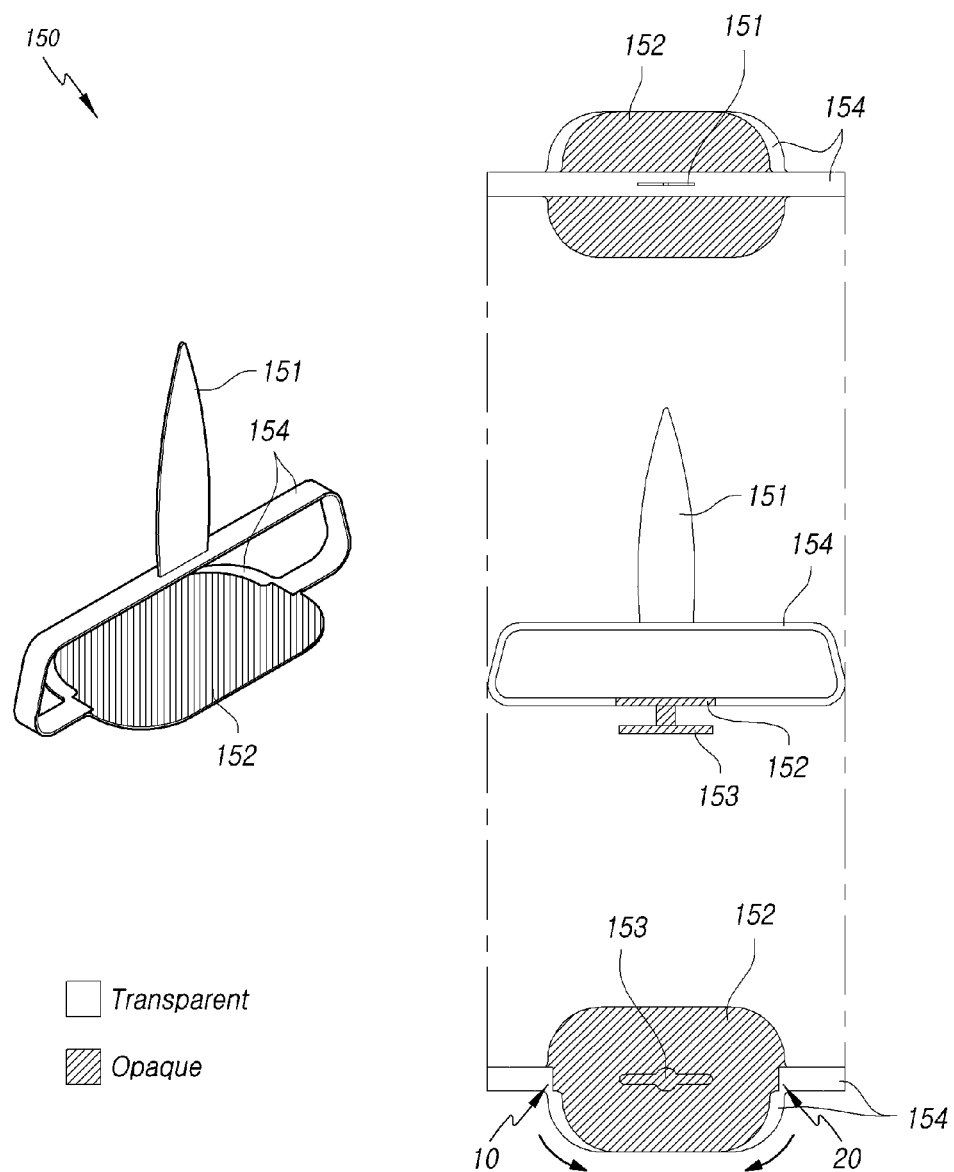
FIG. 7 is view illustrating a third aspect of the diffuser plate supporter according to the aspects of the present disclosure.

FIG. 7 illustrates a third aspect of the diffuser plate supporter 150 according to the present disclosure. In particular, FIG. 7 illustrates an example of the diffuser plate supporter 150 in which the boundary portion between the connection portion 154 and the base 152 is reinforced in order to prevent the diffuser plate supporter 150 from being damaged during rotational fastening.

Referring to FIG. 7, the diffuser plate supporter 150 according to the third aspect includes a transparent support portion 151 having a protruding shape, a transparent connection portion 154 extending horizontally at the lower end portion of the support portion 151 and bent in the vertical direction, an opaque base 152, a side surface of which is partially connected to the connection portion 154, and an opaque fastening portion 153 protruding from the lower portion of the base 152.

Since the support portion 151 and the connection portion 154 are made of a transparent material, they can be integrally formed. In addition, the base 152 and the fastening portion 153 are made of an opaque material, and are integrally formed with a portion, which is made of a transparent material, through dual injection molding.

Here, the connection portion 154 may have a structure extending from a boundary portion in which the connection portion 154 is connected to the base 152 and enclosing the side surface of the base 152. Alternatively, the connection portion 154 may have a structure at least partially enclosing the side surface and the top surface or the side surface of the base 152. Such a structure may be seen as if a part of the portion of the base 152, which meets the connection portion 154, is made transparent.

Accordingly, the connection portion 154 may include a part which connects the support portion 151 and the base 152 each other, and a part which encloses the side surface of the base 152. And the part of the connection portion 154 which connects the support portion 151 and the base 152 each other may have a shape bending in a vertical direction, and the part of the connection portion 154 which encloses the side surface of the base 152 may have a shape bending in a horizontal direction.

Furthermore, a width of the part of the connection portion 154 which connects the support portion 151 and the base 152 each other may be broader than a width of the part of the connection portion 154 which encloses the side surface of the base 152. That is, the part of the connection portion 154 which connects the support portion 151 and the base 152 each other may have a wide width relatively for rigidity. And the part of the connection portion 151 which encloses the side surface of the base 152 may have a narrow width relatively to increase a rigidity but prevent a light leakage.

The connection portion 154 made of a transparent material may be formed in a structure extending from the boundary between the connection portion and the base 152 and enclosing the base 152 so as to increase the contact area between the connection portion 154 and the base 152. That is, the connection portion 154 and the base 152 may be in contact with each other in a range widened beyond the width of the connection portion 154.

By increasing the contact area between the connection portion 154 made of a transparent material and the base 152 made of an opaque material, it is possible to prevent the structures, which are made of different materials, from being separated from each other at the boundary therebetween during the rotational fastening of the diffuser plate supporter 150. That is, through the increase of the contact area between the structures made of different materials, the force against the rotational force is increased, so that the diffuser plate supporter 150 is prevented from being damaged during the rotational fastening thereof.

The structure reinforcing the boundary portion between the connection portion 154 and the base 152 can be applied to all the boundary portions of the connection portion 154 and the base 152.

For example, as illustrated in FIG. 7, the connection portion 154 connected to the first side surface 10 of the base 152 may extend to enclose the side surface of the base 152 in a first direction (e.g., the counterclockwise direction). That is, the connection portion 154 may have a structure enclosing the peripheral side surfaces of the first side surface 10 and the first side surface 10 of the base 152.

The connection portion 154, which is connected to the second side surface 20 of the base 152, may have a structure extending while enclosing the side surface of the base 152 in a second direction (e.g., the clockwise direction) so as to enclose the peripheral side surface of the second side surface 20 and the second side surface 20 of the base 152.

Therefore, the connection portion 154 and the base 152 can be prevented from being separated from each other by the rotational force during the rotational fastening of the diffuser plate supporter 150 by reinforcing each boundary where the connection portion 154 is connected to the base 152.

The reinforcement design for the boundary portion between the connection portion 154 and the base 152 may be made in various structures.

Figure 8:
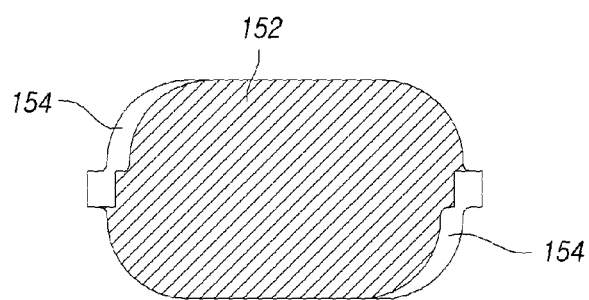
FIGS. 8 and 9 are views illustrating other examples of the diffuser plate supporter according to the third aspect.
Figure 9:
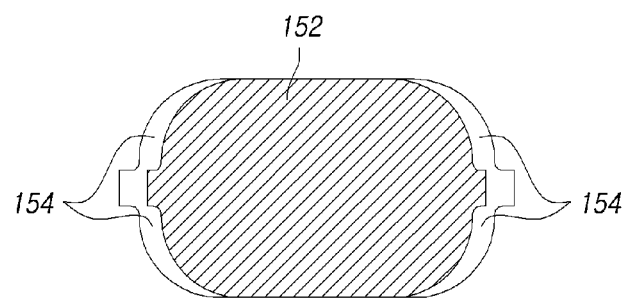

FIGS. 8 and 9 are views illustrating other examples of the reinforcement design structure of the diffuser plate supporter 150 according to the third aspect.

Referring to FIG. 8, in the diffuser plate supporter 150 according to the third aspect, a connection portion 154 extends in one direction in a boundary portion connected to the base 152. The reinforcement design structure may be configured such that the connection portions extend in the same direction (e.g., in the clockwise direction) in two boundary portions and enclosing the side surface of the base 152.

Specifically, the reinforcement structure may be configured such that a connection portion 154 extends clockwise in one of two boundary portions, in which the connection portions 154 are connected to the base 152, to enclose the base 152, and the other connection portion 154 also extends clockwise in the other boundary portion to enclose the base 152.

That is, the connection portions 154 extend in the same rotational direction at two points and increase the contact area between the side surface of the base 152 and the connection portions 154, so that it is possible to further increase the force against the rotational force during the rotational fastening of the diffuser plate supporter 150.

Alternatively, in order to enhance the reinforcement design, the connection portions 154 may be configured to extend in both directions in the boundary portions where the connection portions 154 are connected to the base 152, as illustrated in FIG. 9.

Specifically, a connection portion 154 extends in both directions in one of the boundary portions connected to the base 152 so as to form a structure enclosing the base 152, and another connection portion also extend in both directions in the other boundary portion so as to form a structure enclosing the base 152. As a result, since the contact area between the connection portions 154 and the base 152 are increased as a whole, the boundary between the connection portions 154 and the base 152 can be more firmly formed.

At this time, since it is necessary for the base 152 to be capable of preventing the back side light leakage of the cover bottom 130 in the state of being fastened to the cover bottom 130, the connection portion 154 made of a transparent material may be formed to extend in a range in which the light leakage prevention function of the base 152 does not deteriorate.

Figure 10:
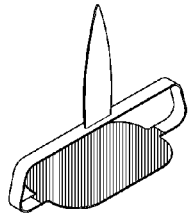
FIG. 10 is a table showing the results of testing whether or not the diffuser plate supporters according to the second aspect and the diffuser plate supporters according to the third aspect are damaged during rotational fastening.
Figure 10:
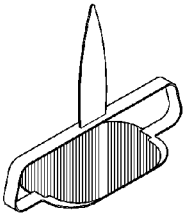

FIG. 10 represents a result of testing whether the diffuser plate supporter 150 according to the second aspect and the diffuser plate supporter 150 according to the third aspect are damaged during the rotational fastening of the diffuser plate supporters 150.

Referring to FIG. 10, a table represents results of a test performed by a person A in which rotational fastening of each of the diffuser plate supporter 150 according to the second aspect and the diffuser plate supporter 150 according to the third aspect is performed five times, and a test performed by another person B, which is the same test as the test performed by the person A.

As represented in the test result table of FIG. 10, in the diffuser plate supporter 150, when the diffuser plate supporter 150 of the second aspect having a small contact area between the connection portions 154 and the base 152 was fastened to the cover bottom 130, in the test performed by the person A, the connection portions 154 and the base 152 were separated from each other twice and in the test performed by the person B, the connection portions 154 and the base were separated from each other once.

On the other hand, when the diffuser plate supporter 150 according to the third aspect formed by increasing the contact area between the connection portions 154 and the base 152 was fastened to the cover bottom 130, it can be seen that yield can be improved using the diffuser plate supporter 150 according to the third aspect since damage does not occur at all, as represented in FIG. 10.

According to the present disclosure, since the portion of the diffuser plate supporter 150 that supports the diffuser plate 120 is made of a transparent material and the portion of the diffuser plate supporter 150 that is fastened to the cover bottom 130 is made of an opaque material, it is possible to prevent light leakage to the back side of the cover bottom 130 and to support the diffuser plate 120 without interfering with light diffusion to the diffuser plate 120.

In addition, it is possible to prevent the diffuser plate supporter 150 from being damaged due to the rotational force during the rotational fastening of the diffuser plate supporter 150 through the reinforcement design structure for the boundary portion between a portion made of a transparent material and a portion made of an opaque material.

Although aspects of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A diffuser plate supporter comprising:
a transparent support portion having a protruding shape;
a transparent connection portion extending to a horizontal direction from a lower end portion of the transparent support portion and bent to a vertical direction;
an opaque base having first and second side surfaces and a bottom surface, at least a portion of the first and second side surfaces connected to an end of the connection portion; and
an opaque fastening portion protruding from the bottom surface of the base,
wherein the connection portion encloses at least part of the side surface of the base, and a width of a part of the connection portion which connects the support portion and the base each other is broader than a width of a part of the connection portion which encloses at least part of the side surface of the base.

2. The diffuser plate supporter of claim 1, wherein the transparent connection portion extends with enclosing a part of the side surface of the opaque base in the portion where the transparent connection portion is connected to the opaque base.

3. The diffuser plate supporter of claim 1, wherein the transparent connection portion is connected to first and second corresponding side surfaces of the opaque base.

4. The diffuser plate supporter of claim 3, wherein the first connection portion extends to a first direction and connected to the first side surface of the opaque base and encloses a periphery of the first side surface of the opaque base, and the second connection portion extends in a second direction different from the first direction connected to the second side surface of the opaque base and encloses a periphery of the second side surface of the opaque base.

5. The diffuser plate supporter of claim 1, wherein the transparent support portion and the opaque base are spaced apart from each other by the transparent connection portion.

6. A diffuser plate supporter comprising:
a transparent support portion having a protruding shape;
an opaque base connected to a lower end of the transparent support portion and having an area wider than an area of the lower end of the transparent support portion; and
an opaque fastening portion extended from a bottom surface of the opaque base,
wherein the transparent connection portion is connected to first and second corresponding side surfaces of the opaque base, and
wherein the first connection portion extends to a first direction and connected to the first side surface of the opaque base and encloses a periphery of the first side surface of the opaque base, and the second connection portion extends in a second direction different from the first direction connected to the second side surface of the opaque base and encloses a periphery of the second side surface of the opaque base.

7. The diffuser plate supporter of claim 6, wherein the opaque base is partially transparent in a portion where the opaque base is connected to the transparent connection portion.

8. The diffuser plate supporter of claim 6, wherein the transparent connection portion extends with enclosing a part of the side surface of the opaque base in the portion where the transparent connection portion is connected to the opaque base.

9. The diffuser plate supporter of claim 6, wherein the transparent support portion and the opaque base are spaced apart from each other by the transparent connection portion.

10. A backlight unit comprising:
a diffuser plate supporter including,
a transparent support portion having a protruding shape,
a transparent connection portion extending to a horizontal direction from a lower end portion of the transparent support portion and bent to a vertical direction,
an opaque base having first and second side surfaces and a bottom surface, at least a portion of the first and second side surfaces connected to an end of the connection portion, and
an opaque fastening portion protruding from the bottom surface of the base;
a diffuser plate having a bottom surface supported by the diffuser plate supporter; and
a cover bottom accommodating the diffuser plate, the diffuser plate supporter being fastened to the cover bottom,
wherein the transparent connection portion is connected to first and second corresponding side surfaces of the opaque base, and
wherein the first connection portion extends to a first direction and connected to the first side surface of the opaque base and encloses a periphery of the first side surface of the opaque base, and the second connection portion extends in a second direction different from the first direction connected to the second side surface of the opaque base and encloses a periphery of the second side surface of the opaque base.

11. The backlight unit of claim 10, wherein the cover bottom includes a hole to which the diffuser plate supporter is fastened, and the opaque base is located above the hole.

12. The diffuser plate supporter of claim 10, wherein the opaque base is partially transparent in a portion where the opaque base is connected to the transparent connection portion.

13. The diffuser plate supporter of claim 10, wherein the transparent connection portion extends with enclosing a part of the side surface of the opaque base in the portion where the transparent connection portion is connected to the opaque base.

14. The diffuser plate supporter of claim 10, wherein the transparent support portion and the opaque base are spaced apart from each other by the transparent connection portion.

\* \* \* \* \*